(12) United States Patent
Lee et al.

(10) Patent No.: US 8,857,545 B2
(45) Date of Patent: Oct. 14, 2014

(54) IN-WHEEL DRIVE APPARATUS

(75) Inventors: Sang Mok Lee, Gyeonggi-do (KR);
Dong Hyun Kim, Gyeonggi-do (KR);
Kyeong Ho Shin, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 337 days.

(21) Appl. No.: 13/233,556

(22) Filed: Sep. 15, 2011

(65) Prior Publication Data

US 2012/0298432 A1    Nov. 29, 2012

(30) Foreign Application Priority Data

May 23, 2011    (KR) .......................... 10-2011-0048744

(51) Int. Cl.
*B60K 17/04* (2006.01)
*B60K 7/00* (2006.01)

(52) U.S. Cl.
CPC ....... *B60K 7/0007* (2013.01); *B60K 2007/0092* (2013.01); *B60K 7/00* (2013.01); *B60K 2007/0038* (2013.01); *B60K 17/046* (2013.01); *Y10S 903/906* (2013.01)
USPC ...... 180/65.6; 180/65.51; 180/65.1; 180/242; 180/243; 903/906

(58) Field of Classification Search
None
See application file for complete search history.

(56) References Cited

U.S. PATENT DOCUMENTS

| | | | |
|---|---|---|---|
| 7,579,738 B2 * | 8/2009 | Cros et al. ............. | 310/216.004 |
| 7,641,010 B2 * | 1/2010 | Mizutani et al. .......... | 180/65.51 |
| 7,703,780 B2 * | 4/2010 | Mizutani et al. .......... | 280/124.1 |
| 7,958,959 B2 * | 6/2011 | Yogo et al. ................ | 180/65.51 |
| 2004/0080223 A1 * | 4/2004 | Shimizu ..................... | 310/75 C |

* cited by examiner

*Primary Examiner* — J. Allen Shriver, II
*Assistant Examiner* — Hilary L Johns
(74) *Attorney, Agent, or Firm* — Saliwanchik, Lloyd & Eisenschenk (57) ABSTRACT

The present disclosure provides an in-wheel drive apparatus. The apparatus includes a motor housing open at one side thereof, a motor unit mounted within the motor housing, and a rear cover coupled at one side thereof to the motor housing to close the open side of the motor housing and coupled at the other side thereof to a trailing arm. The rear cover includes a planar section constituting an outer peripheral surface of the rear cover; and a cover recess connected to an inner peripheral surface of the planar section to be integrally formed with the planar section and depressed from the planar section towards the rotor to form a recess to which the trailing arm is coupled.

15 Claims, 6 Drawing Sheets

IN-WHEEL DRIVE APPARATUS

CROSS-REFERENCE TO RELATED APPLICATION

This application claims the benefit under 35 U.S.C. §119 of Korean Patent Application No. 10-2011-0048744, filed on May 23, 2011, which is hereby incorporated by reference in its entirety.

BACKGROUND OF THE DISCLOSURE

1. Technical Field

The present disclosure generally relates to an in-wheel drive apparatus and, more particularly, to an in-wheel drive apparatus which minimizes a distance between a wheel center to a chassis coupling section to enhance chassis durability.

2. Description of the Related Art

The depletion of fossil fuel resources has stimulated development of electric vehicles, which drive a motor using electric energy stored in a battery, instead of vehicles using fossil fuels such as gasoline, diesel, and the like.

Electric vehicles are classified into a true electric vehicle which drives a motor using only electric energy stored in a rechargeable battery, a solar cell vehicle which drives a motor using photovoltaic energy, a fuel cell vehicle which drives a motor using a hydrogen fuel cell, a hybrid vehicle which drives an engine using fossil fuel while driving a motor using electricity, and the like.

Generally, an in-wheel motor system is used for a vehicle that drives a motor with electricity as a drive source as in the electric vehicle. The in-wheel motor system enables direction transmission of power to a wheel using a motor disposed inside a wheel rim, unlike a gasoline or diesel vehicle in which wheels are rotated by power transmitted through an engine, transmission, and drive shaft.

Accordingly, the in-wheel motor system may reduce not only the weight of the vehicle but also energy loss during power transmission by eliminating drive and power transmission units, such as an engine, a transmission, and differential gears.

It should be noted that the above description is provided for understanding of the background art and is not a description of a well-known technique in the art.

Conventionally, it is difficult to reduce the distance from a wheel center to a chassis coupling section due to the shapes of a rear cover and a motor, thereby making it difficult to inhibit deterioration in chassis durability.

Further, since a decelerator module is installed inside a motor housing, it is necessary to disassemble the motor housing upon replacement or repair of the decelerator module. Furthermore, since an exclusive jig must be used to disassemble the motor housing, replacement or repair of the decelerator module consumes unnecessary time and cost.

Therefore, there is a need to solve such problems.

BRIEF SUMMARY

One aspect of the present disclosure is to provide an in-wheel drive apparatus that may enhance chassis durability by minimizing a distance from a wheel center to a chassis coupling section.

Another aspect of the present disclosure is to provide an in-wheel drive apparatus which allows a decelerator module to be mounted on an outer surface of a motor housing to reduce the size and weight of products.

A further aspect of the present disclosure is to provide an in-wheel drive apparatus which allows a decelerator module to be detachably mounted to an outer surface of a motor housing to facilitate replacement or repair of the decelerator module.

In accordance with one aspect of the present disclosure, an in-wheel drive apparatus includes: a motor housing open at one side thereof; a motor unit mounted within the motor housing; and a rear cover coupled at one side thereof to the motor housing to close the open side of the motor housing and coupled at the other side thereof to a trailing arm. Here, the motor unit includes a stator disposed along an inner peripheral surface of the motor housing and a rotor rotatably disposed inside the stator. The rotor includes a rotor shaft placed at a center of the motor housing; a magnet mounting section formed on an outer peripheral surface of the rotor and having a magnet mounted thereon to face the stator; and a connection plate connecting the rotor shaft to the magnet mounting section. The rear cover includes a planar section constituting an outer peripheral surface of the rear cover; and a cover recess connected to an inner peripheral surface of the planar section to be integrally formed with the planar section and depressed from the planar section towards the rotor to form a recess to which the trailing arm is coupled.

The connection plate may have a smaller thickness than the magnet mounting section, and the cover recess may be depressed towards the connection plate to form the recess.

The cover recess may be rounded along a shape of the connection plate.

The rotor may have an I-shaped cross-section from the rotor shaft to the magnet mounting section.

The drive apparatus may further include a decelerator module connected at one side thereof to the motor unit and at the other side thereof to an outer surface of the motor housing opposite to the trailing arm. Here, the outer surface of the motor housing includes a planar housing section constituting an outer peripheral surface of the motor housing; and a mounting recess connected to an inner peripheral surface of the planar housing section to be integrally formed with the planar housing section and depressed from the planar housing section towards the connection plate to form a recess to which the decelerator module is coupled.

The decelerator module may include a sun gear located at a center of the decelerator module and splined to the rotor shaft; a planetary gear disposed around the sun gear to engage with an outer peripheral surface of the sun gear; a ring gear having an inner peripheral surface engaging with the planetary gear and a circular outer peripheral surface; a carrier including a carrier plate having a central shaft of the planetary gear mounted thereon and a carrier shaft splined to a hub inner ring; and a cover disposed at one side of the carrier plate and fastened to the ring gear. Here, the mounting recess has a circular shape and has an inner diameter, the size of which is the same as that of an outer diameter of the ring gear.

In accordance with another aspect of the present disclosure, an in-wheel drive apparatus includes: a motor housing open at one side thereof; a motor unit mounted within the motor housing; a rear cover coupled at one side thereof to the motor housing to close the open side of the motor housing and coupled at the other side thereof to a trailing arm; and a decelerator module connected at one side thereof to the motor unit and at the other side thereof to an outer surface of the motor housing opposite to the trailing arm. The motor unit includes a stator disposed along an inner peripheral surface of the motor housing and a rotor rotatably disposed inside the stator. The outer surface of the motor housing includes a planar housing section constituting an outer peripheral surface of the motor housing; and a mounting recess connected to an inner peripheral surface of the planar housing section to be integrally formed with the planar housing section and depressed from the planar housing section towards the rotor to form a recess to which the decelerator module is coupled.

The rotor includes a rotor shaft placed at a center of the motor housing; a magnet mounting section formed on an outer peripheral surface of the rotor and having a magnet mounted thereon to face the stator; and a connection plate connecting the rotor shaft to the magnet mounting section. The connection plate may have a smaller thickness than the magnet mounting section, and the cover recess may be depressed towards the connection plate to form the recess.

The decelerator module may include a sun gear located at a center of the decelerator module and splined to the rotor shaft; a planetary gear disposed around the sun gear to engage with an outer peripheral surface of the sun gear; a ring gear having an inner peripheral surface engaging with the planetary gear and a circular outer peripheral surface; a carrier including a carrier plate having a central shaft of the planetary gear mounted thereon and a carrier shaft splined to a hub inner ring; and a cover disposed at one side of the carrier plate and fastened to the ring gear. Here, the mounting recess has a circular shape and has an inner diameter, the size of which is the same as that of an outer diameter of the ring gear.

The cover may be formed with a flange protruding from an outer peripheral surface thereof, and the outer surface of the motor housing may include a step formed on a rim of the mounting recess to allow the flange of the cover to be seated on the rim of the mounting recess.

The flange may have the same width as that of the step.

The step may be formed with a positioning protrusion which protrudes towards the cover, and the flange may be formed with a positioning hole through which the positioning protrusion passes.

The positioning protrusion may be inserted into an outer ring hole formed in a hub outer ring to secure the hub outer ring.

The hub outer ring may include an outer ring protrusion protruding from an inner side of the hub outer ring towards the cover, and the cover may be formed at one side thereof with a groove into which the outer ring protrusion is fitted.

The flange may be detachably coupled to the step by a fastening member.

BRIEF DESCRIPTION OF THE DRAWINGS

The above and other aspect, features and advantages of the present disclosure will become apparent from the following description of exemplary embodiments given in conjunction with the accompanying drawings, in which.

DETAILED DESCRIPTION

Exemplary embodiments of the present disclosure will now be described in detail with reference to the accompanying drawings.

It should be noted that the drawings are not to precise scale and may be exaggerated in thickness of lines or size of components for descriptive convenience and clarity only. Furthermore, the terms used herein are defined by taking functions of the present disclosure into account and can be changed according to user or operator's custom or intention. In addition, terms, such as "right", "left", "upper", "lower", etc., may only be used for descriptive purposes and are not to be construed as limiting. Therefore, definition of the terms should be made according to the overall disclosure set forth herein.

Referring to FIGS. 1 to 4, an in-wheel drive apparatus 1 according to an exemplary embodiment of the present disclosure includes a motor housing 10, a motor unit 20, a rear cover 30, a decelerator module 40, a resolver 50, a drum brake 60, and a huh 70.

The motor housing 10 receives the motor unit 20. In this embodiment, the motor housing 10 has a substantially C-shaped cross section and is open at a left side thereof (see FIG. 2), to which the rear cover 30 is coupled.

Figure 1:
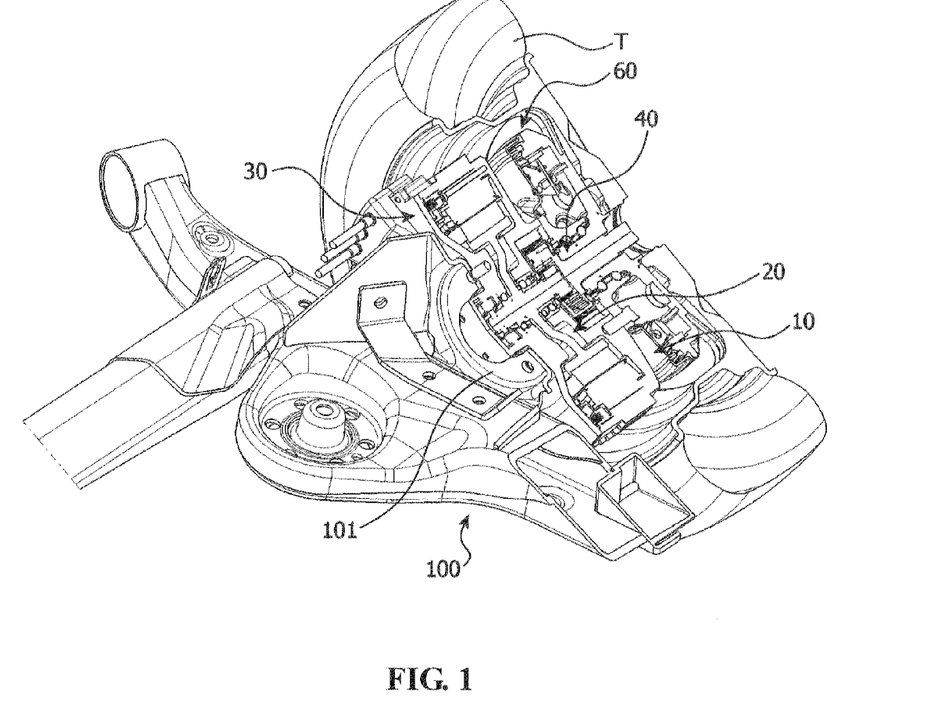
FIG. 1 is a partially cut-away perspective view of an in-wheel drive apparatus according to an exemplary embodiment of the present disclosure when viewed from the left.
Figure 2:
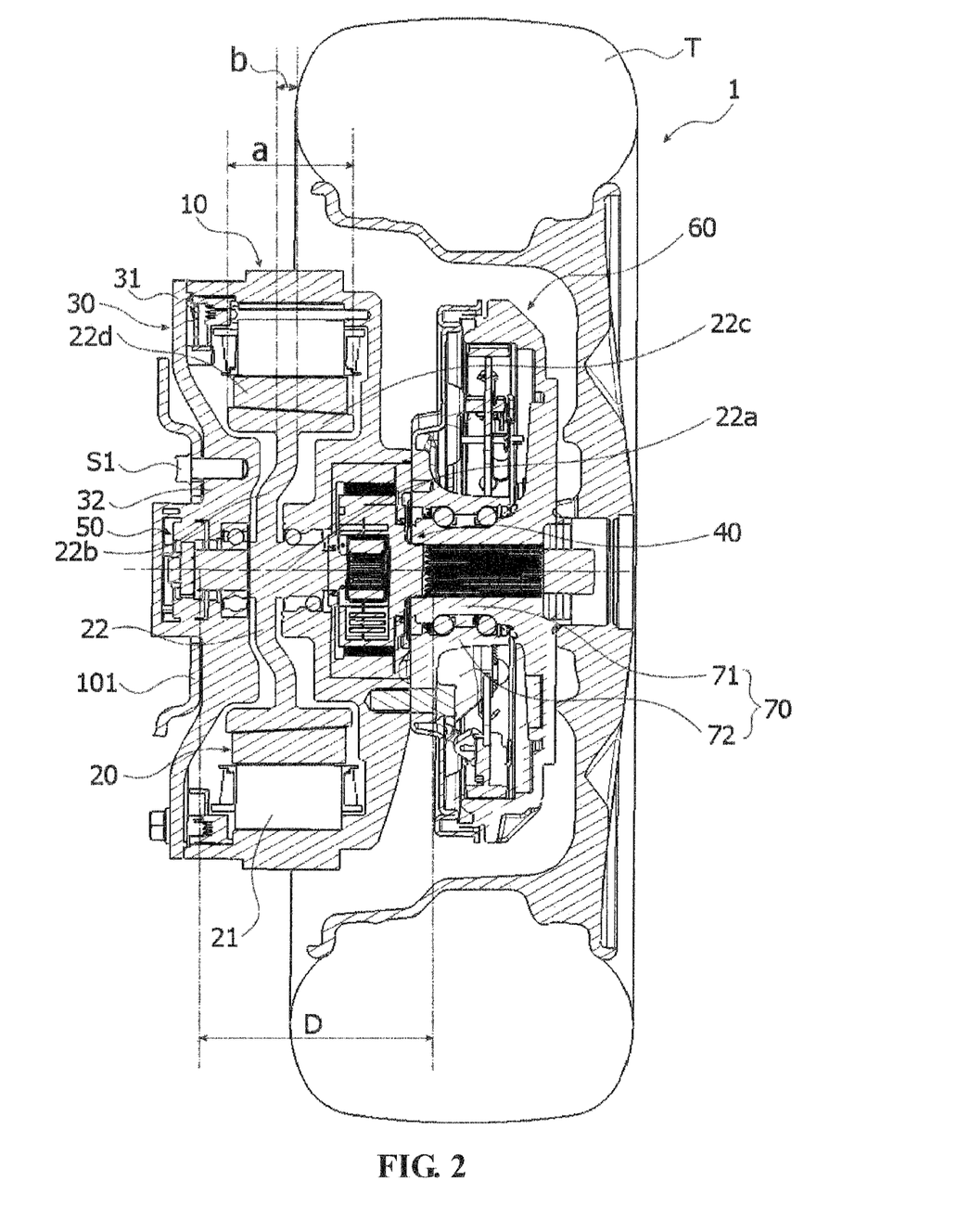
FIG. 2 is a cross-sectional view of the in-wheel drive apparatus according to the exemplary embodiment of the present disclosure.
Figure 5:
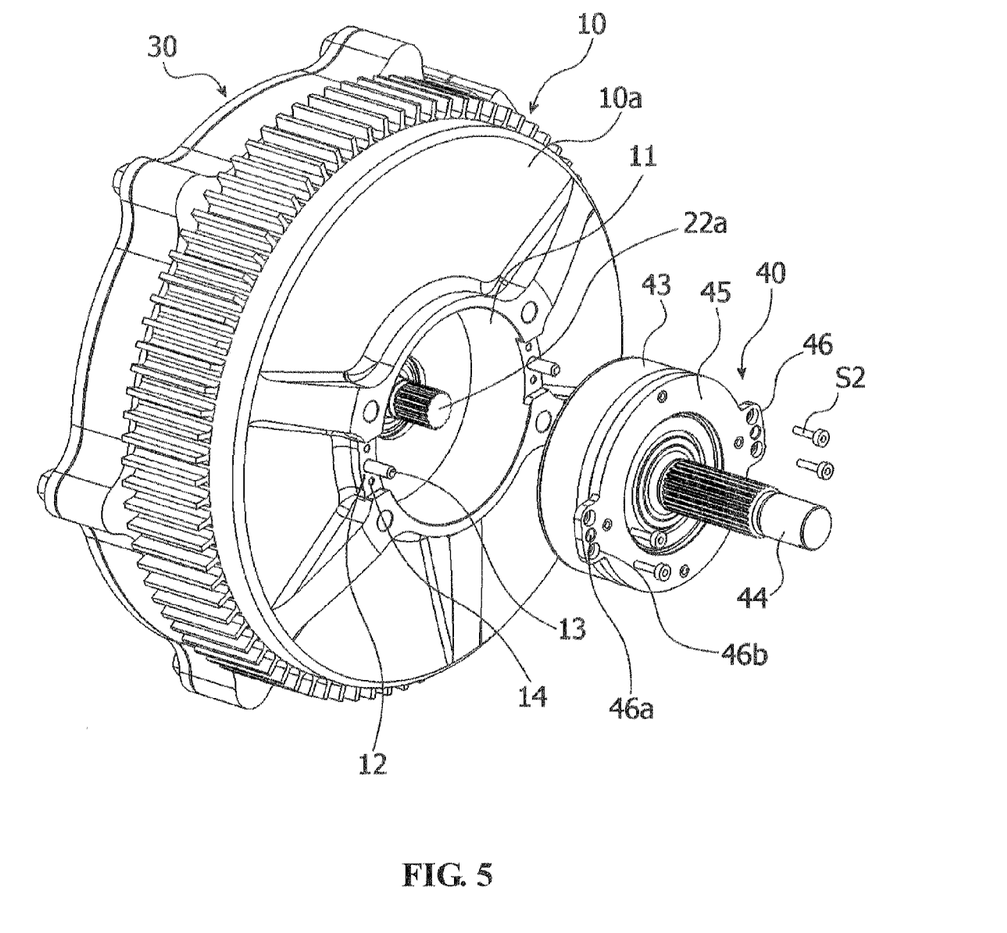
FIG. 5 is a perspective view illustrating a motor housing and a decelerator module of the in-wheel drive apparatus according to the exemplary embodiment of the present disclosure.

Referring to FIGS. 2 and 5, an outer surface of a right side of the motor housing 10 (see FIG. 5) includes a planar housing section 10a constituting an outer peripheral surface of the motor housing and a mounting recess 11 connected to an inner peripheral surface of the planar housing section 10a to be integrally formed with the planar housing section 10a. The mounting recess 11 is formed at the center of the outer surface of the right side of the motor housing 10 and is depressed from the planar housing section 10a to form a recess.

The mounting recess 11 has a shape corresponding to the shape of the decelerator module 40. In this embodiment, since a portion of the decelerator module 40 mounted on the mounting recess 11, that is, a ring gear 43, has a circular shape, the mounting recess 11 also has a circular shape.

The mounting recess 11 has an inner diameter, the size of which is the same as an outer diameter of the decelerator module 40. In this embodiment, the inner diameter of the mounting recess 11 is the same as the outer diameter of the ring gear 43.

Accordingly, when the ring gear 43 of the decelerator module 40 is mounted on the mounting recess 11, the ring gear 43 is inhibited from moving within the mounting recess 11, so that the ring gear 43 becomes coaxial with a rotor shaft 22a.

After being mounted on the mounting recess 11, the decelerator module 40 is coupled to the motor housing 10 via fastening members S2.

According to this embodiment, the decelerator module 40 may be firmly coupled to the motor housing 10 simply by mounting the decelerator module 40 in the mounting recess 11 and then fastening the fastening members S2 thereto. The decelerator module 40 may also be easily detached from the motor housing 10 simply by releasing the fastening members S2 and then separating the decelerator module 40 from the mounting recess 11.

As such, since the decelerator module 40 is mounted on the mounting recess 11 formed on the outer surface of the motor housing 10, the decelerator module 40 may be easily mounted on or detached from the motor housing 10. As a result, it is possible to reduce time and cost for replacement and repair of the decelerator module 40.

Further, in the event where the motor unit 20 is in an abnormal state within the motor housing 10, the motor unit 20 can be advantageously repaired quickly without touching the decelerator module 40, since the decelerator module 40 is coupled to the outer surface of the motor housing 10 instead of being received therein.

When the decelerator module 40 is mounted on the mounting recess 11, the decelerator module 40 is deeply inserted into the mounting recess 11 by the depth of the mounting recess 11. Thus, a right part of the decelerator module 40 (in FIG. 2) does not significantly protrude from the planar housing section 10a. Namely, as the mounting recess 11 is formed on the outer surface of the motor housing 10 and the decelerator module 40 is inserted into the mounting recess 11, it is possible to realize a reduction in the size and weight of the in-wheel drive apparatus 1.

Referring to FIGS. 2, 3, 5 and 6, the decelerator module 40 includes a sun gear 41, a plurality of planetary gears 42, a ring gear 43, a carrier 44, and a cover 45.

The sun gear 41 is splined to the rotor shaft 22a. The rotor shaft 22a is rotatably supported by bearings 16. An outer peripheral surface of the sun gear 41 engages with the planetary gears 42.

The plural planetary gears 42 is arranged at constant angles around the sun gear 41. The planetary gears 42 engage with the sun gear 41 and the ring gear 43 at inner and outer sides thereof, respectively.

An inner peripheral surface of the ring gear 43 engages with the planetary gears 42. The carrier 44 includes a carrier plate 44a and a carrier shaft 44b. The carrier plate 44a is provided with a central shaft 42a of the planetary gear 42. The carrier shaft 44b is splined to an inner ring 72 of the hub 70.

Referring to FIG. 5, the cover 45 is placed at the right side of the ring gear 43 and is coupled to the ring gear 43. The cover 45 has flanges 46 protruding from an outer peripheral surface thereof. In this embodiment, the cover 45 is illustrated as including two flanges 46. However, the present disclosure is not limited thereto, and the cover 45 may include a single or three or more flanges.

Each of the flanges 46 includes a positioning hole 46a formed at the center of the flange 46 and through-holes 46b formed at both sides of the positioning hole 46a.

The motor housing 10 is formed with steps 12 on a rim of the mounting recess 11. The steps 12 are depressed with respect to the planar housing section 10a. The flanges 46 are seated on the steps 12. The step 12 has the same width as that of the flange 46 to inhibit movement of the flange 46 seated on the step 12. Further, the number of steps 12 is identical to the number of flanges 46.

Referring to FIG. 5, each of the steps 12 includes a positioning protrusion 13 formed at the center of the step and fastening grooves 14 formed at both sides of the positioning protrusion 13.

When the flange 46 is seated on the step 12, the positioning protrusion 13 and the positioning hole 46a serve to guide the flange 46 to be safely seated on the step 12. Namely, when the decelerator module 40 is moved towards the motor housing 10 with the positioning holes 46a placed on the positioning protrusions 13, the positioning protrusions 13 guide the positioning holes 46a such that flanges 46 are safely seated on the steps 12, respectively.

The positioning protrusions 13 and the positioning holes 46a serve to allow the decelerator module 40 to be temporarily mounted on the motor housing 10 before inserting the fastening members S2. Thus, the decelerator module 40 may be more accurately fastened to the motor housing 10 using the fastening members S2.

The positioning protrusions 13 and the positioning holes 46a inhibit movement of the decelerator module 40 within the mounting recess 11. Since the cover 45 and the ring gear 43 are coupled to each other by fastening members S3, both the cover 45 and the ring gear 43 are simultaneously secured by the positioning protrusions 13. As a result, since the ring gear 43 is inhibited from moving within the mounting recess 11, the ring gear 43 may become coaxial with the rotor shaft 22a.

The fastening members S2 are fastened to the fastening grooves 14 of the steps 12 through the through-holes 46b of the flanges 46. As a result, the decelerator module 40 may be detachably coupled to the outer surface of the motor housing 10 via the fastening members S2.

When the carrier 44 of the decelerator module 40 is rotated, the ring gear 43 is subjected to rotational force by the principle of action and reaction. According to the present embodiment, since rotation of the ring gear 43 may be inhibited not only by the fastening members S2 coupling the decelerator module 40 to the motor housing 10, but also by the flanges 46, the steps 12, the positioning protrusions 13 and the positioning holes 46a, the decelerator module 40 may have improved output performance.

The hub 70 is provided to the right side of the decelerator module 40. Namely, the motor housing 10, the decelerator module 40, and the hub 70 are arranged in this order within the in-wheel drive apparatus 1.

Figure 6:
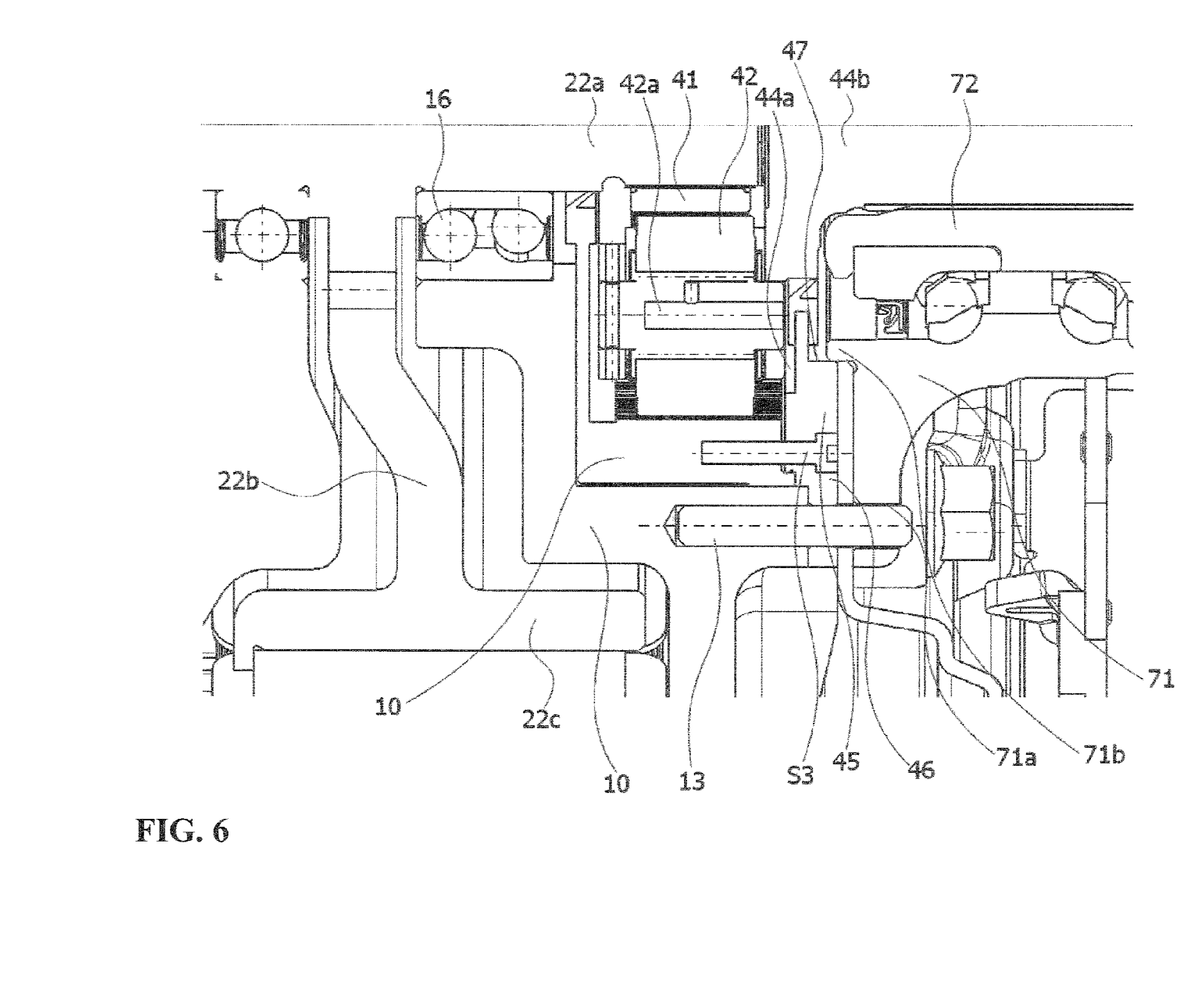
FIG. 6 is a partially enlarged cross-sectional view of the in-wheel drive apparatus according to the exemplary embodiment of the present disclosure.

Referring to FIG. 6, the positioning protrusion 13 extends through the positioning hole 46a to protrude from the positioning hole 46a. With this configuration, the positioning protrusion 13 secures a hub outer ring 71 through an outer ring hole 71a formed on the hub outer ring 71.

The hub outer ring 71 is formed at an inner side thereof with an outer ring protrusion 71b. The outer ring protrusion 71b protrudes towards the decelerator module 40. Referring again to FIG. 5, the cover 45 is formed at one side thereof with a groove 47. The outer ring protrusion 71b is inserted into the groove 47. As a result, the hub outer ring 71 is more firmly secured with respect to the decelerator module 40.

In this manner, as the hub outer ring 71 is secured to the positioning protrusion 13 and the outer ring protrusion 71b is inserted into the groove 47, the hub 70 may become coaxial with the rotor shaft 22a and the decelerator module 40.

As described above, since the ring gear 43 is coaxial with the rotor shaft 22a and the huh 70 is coaxial with the rotor shaft 22a and the decelerator module 40, it is possible to maintain concentricity of respective rotational axes of the motor unit 20, the hub 70 and the decelerator module 40 during transmission of rotational force from the motor unit 20 to the hub 70 through the decelerator module 40. As a result, it is possible to suppress noise or vibration while enhancing power transmission efficiency. Further, it is possible to inhibit wear and damage of gear units, such as the sun gear 41, the planetary gears 42, and the ring gear 43, in the decelerator module 40.

Figure 3:
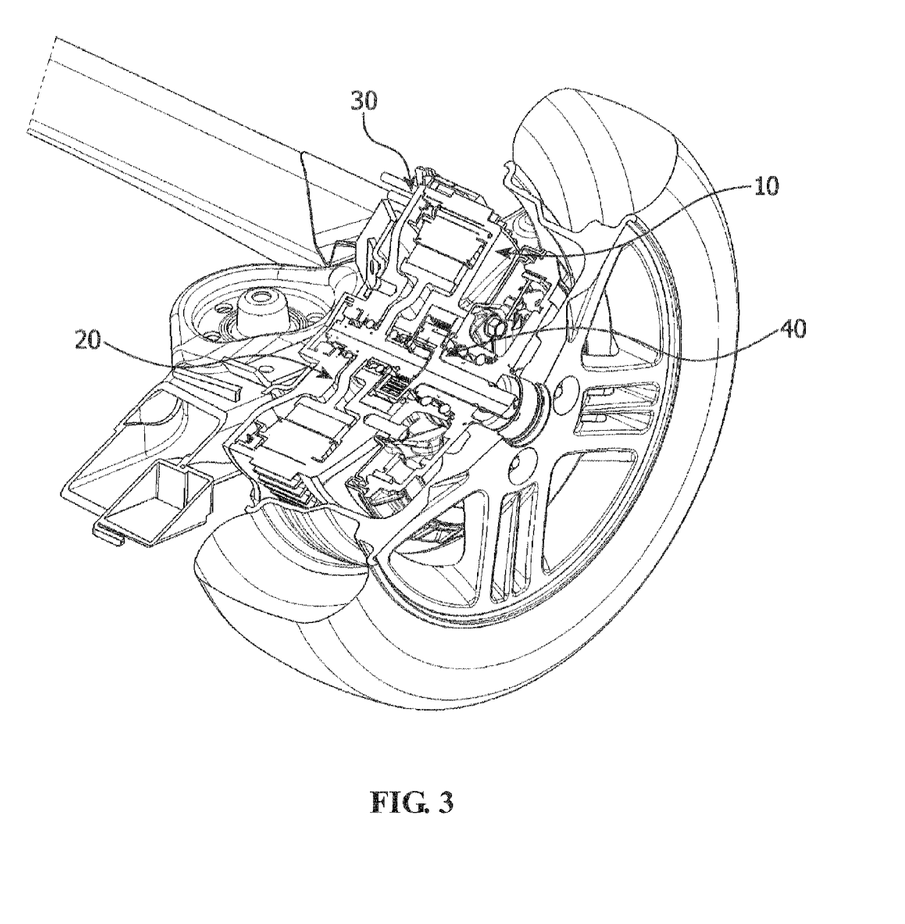
FIG. 3 is a partially cut-away perspective view of the in-wheel drive apparatus according to the exemplary embodiment of the present disclosure when viewed from the right.
Figure 4:
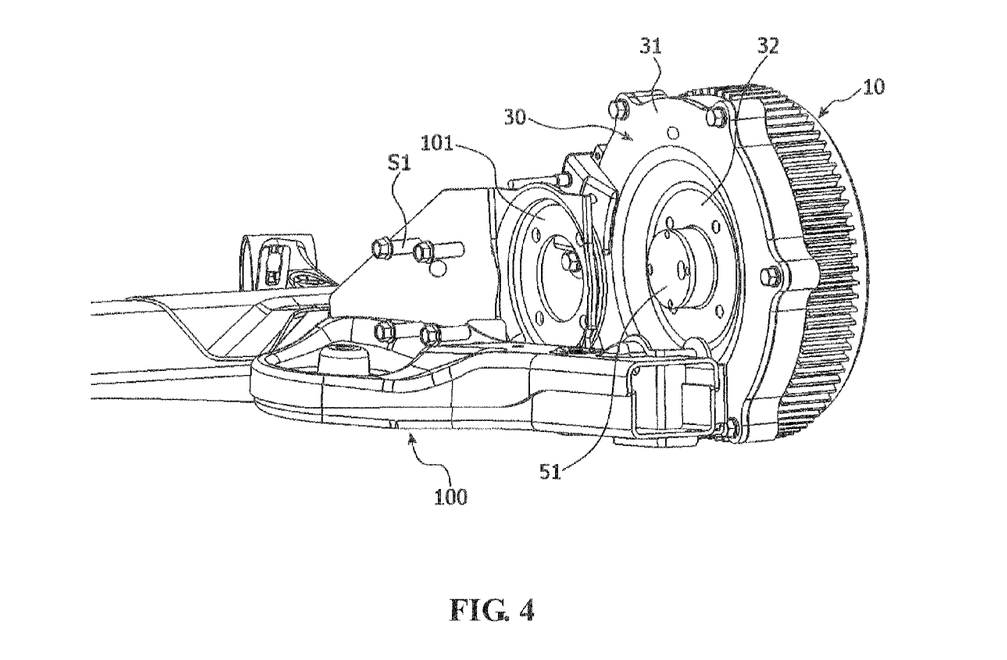
FIG. 4 is a perspective view illustrating a trailing arm and a rear cover of the in-wheel drive apparatus according to the exemplary embodiment of the present disclosure.

Referring to FIG. 2 to FIG. 4, the motor unit 20 is received in the motor housing 10 and generates power. The motor unit 20 includes a stator 21 coupled to the motor housing 10 and a rotor 22 rotatably disposed inside the stator 21.

A plurality of coils (not shown) is wound around the stator 21 and a magnet 22d is mounted on an outer surface of the rotor 22 to face the coil. The coils and the magnet 22d are slightly separated from each other. The coils are connected to an inverter in a vehicle via a power line (not show) to receive electric power supplied therethrough.

The rotor 22 includes a rotor shaft 22a disposed at the center thereof, a magnet mounting section 22c formed at an outer periphery thereof, and a connection plate 22b which connects the rotor shaft 22a to the magnet mounting section 22c.

The rear cover 30 includes a planar section 31 constituting an outer peripheral surface of the rear cover 30, and a cover recess 32 connected to an inner peripheral surface of the planar section 31 to be integrally formed with the planar section 31. The cover recess 32 is depressed from the planar section 31 towards the motor unit 20.

Referring to FIG. 2, the rear cover 30 is coupled at one side thereof to the motor housing 10 and at the other side thereof to the trailing arm 100. In this embodiment, the planar section 31 of the rear cover 30 is coupled to the motor housing 10 and the cover recess 32 of the rear cover 30 is coupled to a spindle bracket 101 of the trailing arm 100 via fastening members S1.

The connection plate 22b has a smaller thickness "b" than the thickness "a" of the magnet mounting section 22c. With this configuration, the rotor 22 has a substantially I-shaped cross section from the rotor shaft 22a to one side of the magnet mounting section 22c. In other words, the overall cross-section of the rotor 22 has a substantially "王"-shape from an upper side of the magnet mounting section 22c to a lower side of the magnet mounting section 22c (in FIG. 2).

Since the thickness "b" of the connection plate 22b is smaller than the thickness "a" of the magnet mounting section 22c, the connection plate 22b is provided at opposite sides thereof with spaces corresponding to a difference in thickness between the magnet mounting section 22c and the connection plate 22b. The shapes of the rear cover 30 and the right side outer surface of the motor housing 10 are changed so as to reduce the overall size of the in-wheel drive apparatus 1 using these spaces.

The mounting recess 11 formed on the outer surface of the motor housing 10 is depressed leftwards to use the space at the right side of the connection plate 22b. With this configuration, the decelerator module 40 may be placed closer to the trailing arm 100 as compared with the in-wheel drive apparatus in the art, thereby reducing the distance between the trailing arm 100 and the decelerator module 40.

In the rear cover 30, the cover recess 32 is depressed rightwards from the planar section 31 so as to use the space at the left side of the connection plate 22b. With this configuration, the trailing arm 100 at the left side of the rear cover 30 may be placed closer to the decelerator module 40 as compared with the in-wheel drive apparatus in the art, thereby reducing the distance between the trailing arm 100 and the decelerator module 40.

For the in-wheel drive apparatus 1 according to this embodiment, as a distance from a wheel center to a chassis coupling section, that is, a distance D from the wheel center to a coupling section between the rear cover 30 and the trailing arm 100, decreases, it is possible to realize more advantageous operation under pressure load transmitted thereto upon driving of the vehicle while enhancing chassis durability.

Since the decelerator module 40 receiving rotational force from the motor unit 20 to drive a wheel (reference numeral omitted) is connected to the rotor shaft 22a, the distance D from the wheel center to the chassis coupling section is determined depending on the shapes of the rear cover 30, the motor unit 20 and the motor housing 10, and the location of the decelerator module 40.

In this embodiment, since the thickness "b" of the connection plate 22b is smaller than the thickness "a" of the magnet mounting section 22c, it is possible to achieve a significant reduction of the distance D from the wheel center to the chassis coupling section, as compared with the related art by changing the shapes of the rear cover 30 and the motor housing 10 using such a thickness difference.

Further, in this embodiment, since the decelerator module 40 is deeply inserted into the mounting recess 11, it is possible to reduce the distance D from the wheel center to the chassis coupling section by the depth of the mounting recess 11, as compared with a conventional exterior type decelerator module.

As such, by forming the connection plate 22b to have a smaller thickness "b" than the thickness "a" of the magnet mounting section 22c while forming the cover recess 32 on the rear cover 30 and forming the mounting recess 11 on the motor housing 10, it is possible to achieve a significant reduction of the distance D from the wheel center to the chassis coupling section as compared with the related art. With this configuration, the in-wheel drive apparatus 1 according to this embodiment may realize more advantageous operation under pressure load transmitted thereto upon driving of the vehicle while enhancing chassis durability.

Reference numerals 50, 51, 60 and T denote a resolver, a resolver cover, a drum brake, and a tire, respectively.

As such, according to the embodiment, the in-wheel drive apparatus may minimize the distance from the wheel center to the chassis coupling section, thereby enhancing chassis durability.

In addition, the in-wheel drive apparatus includes the decelerator module mounted on the outer surface of the motor housing, thereby reducing the size and weight of final products.

Further, the in-wheel drive apparatus allows the decelerator module detachably mounted to the outer surface of the motor housing, thereby facilitating replacement or repair of the decelerator module.

Although some embodiments have been described, it should be understood that the embodiments are given by way of illustration only and is not to be construed as limiting, and that various modifications, variations, and alterations can be made by those skilled in the art without departing from the spirit and scope of the present disclosure, which are limited only by the accompanying claims and equivalents thereof.

What is claimed is:

1. An in-wheel drive apparatus comprising:
a motor housing open at one side thereof;
a motor unit mounted within the motor housing, the motor unit comprising:
a stator disposed along an inner peripheral surface of the motor housing; and
a rotor rotatably disposed inside the stator, the rotor comprising a rotor shaft placed at a center of the motor housing, a magnet mounting section formed on an outer peripheral surface of the rotor and having a magnet mounted thereon to face the stator, and a connection plate interposed between the rotor shaft and the magnet mounting section and connecting the rotor shaft to the magnet mounting section, wherein a lower portion of the connection plate protrudes leftwards and an upper portion of the connection plate protrudes rightwards to create a cavity such that a cover recess of a rear cover protrudes rightwards into the cavity created; and
wherein the rear cover is coupled at one side thereof to the motor housing to close the open side of the motor housing and at the other side thereof to a trailing arm, the rear cover comprising:
a planar section constituting an outer peripheral surface of the rear cover; and the cover recess connected to an inner peripheral surface of the planar section to be integrally formed with the planar section and depressed from the planar section towards the rotor to form a recess to which the trailing arm is coupled.

2. The apparatus of claim 1, wherein the connection plate has a smaller thickness than the magnet mounting section, and the cover recess is depressed towards the connection plate to form the recess.

3. The apparatus of claim 2, wherein the cover recess is rounded along a shape of the connection plate.

4. The apparatus of claim 2, wherein the rotor has an I-shaped cross-section from the rotor shaft to the magnet mounting section.

5. The apparatus of claim 2, further comprising:
a decelerator module connected at one side thereof to the motor unit and at the other side thereof to an outer surface of the motor housing opposite to the trailing arm, the outer surface of the motor housing comprising a planar housing section constituting an outer peripheral surface of the motor housing, and a mounting recess connected to an inner peripheral surface of the planar housing section to be integrally formed with the planar housing section and depressed from the planar housing section towards the connection plate to form a recess to which the decelerator module is coupled.

6. The apparatus of claim 5, wherein the decelerator module comprises:
a sun gear located at a center of the decelerator module and splined to the rotor shaft;
a planetary gear disposed around the sun gear to engage with an outer peripheral surface of the sun gear;
a ring gear having an inner peripheral surface engaging with the planetary gear, and a circular outer peripheral surface;
a carrier including a carrier plate having a central shaft of the planetary gear mounted thereon and a carrier shaft splined to a hub inner ring; and
a cover disposed at one side of the carrier plate and fastened to the ring gear,
the mounting recess having a circular shape and having an inner diameter, the size of which is the same as that of an outer diameter of the ring gear.

7. An in-wheel drive apparatus comprising:
a motor housing open at one side thereof;
a motor unit mounted within the motor housing, the motor unit comprising:
a stator disposed along an inner peripheral surface of the motor housing; and
a rotor rotatably disposed inside the stator, wherein the rotor comprises a rotor shaft, a magnet mounting section, and a connection plate interposed between the rotor shaft and the magnet mounting section, and wherein a lower portion of the connection plate protrudes leftwards and an upper portion of the connection plate protrudes rightwards to create a cavity such that a cover recess of a rear cover protrudes rightwards into the cavity created;
wherein the rear cover is coupled at one side thereof to the motor housing to close the open side of the motor housing and coupled at the other side thereof to a trailing arm; and a decelerator module connected at one side thereof to the motor unit and at the other side thereof to an outer surface of the motor housing opposite to the trailing arm, the outer surface of the motor housing comprising a planar housing section constituting an outer peripheral surface of the motor housing, and a mounting recess connected to an inner peripheral surface of the planar housing section to be integrally formed with the planar housing section and depressed from the planar housing section towards the rotor to form a recess to which the decelerator module is coupled.

8. The apparatus of claim 7, wherein the rotor comprises:
the rotor shaft placed at a center of the motor housing;
the magnet mounting section formed on an outer peripheral surface of the rotor and having a magnet mounted thereon to face the stator; and
the connection plate connecting the rotor shaft to the magnet mounting section, the connection plate having a smaller thickness than the magnet mounting section, the cover recess being depressed towards the connection plate to form the recess.

9. The apparatus of claim 8, wherein the decelerator module comprises:
a sun gear located at a center of the decelerator module and splined to the rotor shaft;
a planetary gear disposed around the sun gear to engage with an outer peripheral surface of the sun gear;
a ring gear having an inner peripheral surface engaging with the planetary gear and a circular outer peripheral surface;
a carrier including a carrier plate having a central shaft of the planetary gear mounted thereon and a carrier shaft splined to a hub inner ring; and
a cover disposed at one side of the carrier plate and fastened to the ring gear,
the mounting recess having a circular shape and having an inner diameter, the size of which is the same as that of an outer diameter of the ring gear.

10. The apparatus of claim 9, wherein the cover is formed with a flange protruding from an outer peripheral surface thereof, and the outer surface of the motor housing comprises a step formed on a rim of the mounting recess to allow the flange of the cover to be seated on the rim of the mounting recess.

11. The apparatus of claim 10, wherein the flange has the same width as that of the step.

12. The apparatus of claim 10, wherein the step is formed with a positioning protrusion which protrudes towards the cover, and the flange is formed with a positioning hole through which the positioning protrusion passes.

13. The apparatus of claim 12, wherein the positioning protrusion is inserted into an outer ring hole formed in a hub outer ring to secure the hub outer ring.

14. The apparatus of claim 13, wherein the hub outer ring comprises an outer ring protrusion protruding from an inner side of the hub outer ring towards the cover, and the cover is formed at one side thereof with a groove, into which the outer ring protrusion is fitted.

15. The apparatus of claim 10, wherein the flange is detachably coupled to the step by a fastening member.

* * * * *